(12) United States Patent
McConkey et al.

(10) Patent No.: US 12,475,396 B2
(45) Date of Patent: Nov. 18, 2025

(54) QUBIT AND READOUT OVERLAP OPTIMIZATION VIA DIPOLE ORIENTATION

(71) Applicant: INTERNATIONAL BUSINESS MACHINES CORPORATION, Armonk, NY (US)

(72) Inventors: Thomas George McConkey, Long Island City, NY (US); April Carniol, Ossining, NY (US); Srikanth Srinivasan, Mount Kisco, NY (US); Joseph Robert Suttle, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 632 days.

(21) Appl. No.: 17/932,269

(22) Filed: Sep. 14, 2022

(65) Prior Publication Data
US 2024/0086752 A1    Mar. 14, 2024

(51) Int. Cl.
*G06N 10/40* (2022.01)
(52) U.S. Cl.
CPC .................................. *G06N 10/40* (2022.01)
(58) Field of Classification Search
USPC .................................................. 716/100, 110
See application file for complete search history.

(56) References Cited

U.S. PATENT DOCUMENTS

| | | | |
|---|---|---|---|
| 10,134,972 B2 | 11/2018 | Oliver et al. | |
| 10,468,740 B2 | 11/2019 | Minev et al. | |
| 10,599,990 B2 | 3/2020 | Leek | |
| 10,665,769 B2 | 5/2020 | Caudillo et al. | |
| 10,748,082 B2 | 8/2020 | Rigetti et al. | |
| 11,112,842 B1* | 9/2021 | Smith | G06N 10/40 |
| 11,177,912 B2 | 11/2021 | Elsherbini et al. | |
| 12,086,689 B1* | 9/2024 | Kelly | H10N 60/815 |
| 2019/0273197 A1 | 9/2019 | Roberts et al. | |
| 2020/0168782 A1* | 5/2020 | Adiga | G06N 10/20 |
| 2020/0265334 A1 | 8/2020 | Haider et al. | |
| 2020/0364600 A1* | 11/2020 | Elsherbini | H01L 25/18 |
| 2020/0381608 A1 | 12/2020 | Olivadese et al. | |
| 2021/0305315 A1 | 9/2021 | Solgun et al. | |

FOREIGN PATENT DOCUMENTS

EP         3580702 B1        3/2021

* cited by examiner

*Primary Examiner* — Brian Ngo
(74) *Attorney, Agent, or Firm* — Amin, Turocy & Watson, LLP (57) ABSTRACT

A device includes a first set of circuit components implementing a qubit and a second set of circuit components implementing a readout resonator for reading out a state of the qubit. A first footprint of the first set of circuit components overlaps a second footprint of the second set of circuit components. The first footprint is oriented relative to the second footprint based on a first electric dipole of the first set of circuit components and a second electric dipole of the second set of circuit components.

17 Claims, 6 Drawing Sheets

QUBIT AND READOUT OVERLAP OPTIMIZATION VIA DIPOLE ORIENTATION

BACKGROUND

Technical Field

The present disclosure generally relates to quantum computation systems.

Description of the Related Arts

Quantum computation exploits quantum phenomena for information processing and communication. Various models of quantum computation exist, and the most popular models include the concepts of qubits and quantum gates. A qubit is a generalization of a bit that has two possible states, but can be in a quantum superposition of both states. A quantum gate describes the transformation that one or more qubits will experience after the gate is applied on them, given their initial state. Various quantum phenomena, such as superposition and entanglement, do not have analogs in the world of classical computing and therefore may involve special structures, techniques, and materials.

The state of a qubit can be read out by coupling the qubit dispersively to a resonator circuit. As the different qubit states shift the resonance frequency differently, the frequency change can be detected by measuring the phase of a microwave pulse reflected on (or transmitted through) the resonator.

SUMMARY

Some embodiments of the disclosure provide a qubit device with reduced size. The device includes a first set of circuit components implementing a qubit and a second set of circuit components implementing a readout resonator for reading out a state of the qubit. A first footprint of the first set of circuit components overlaps a second footprint of the second set of circuit components. The orientation of the first footprint relative to the second footprint is determined based on a first electric dipole of the first set of circuit components and a second electric dipole of the second set of circuit components.

The qubit device may include a substrate and an interposer, where the first footprint is on a first surface of the substrate and the second footprint is on a first surface of the interposer. The qubit device may include a substrate, where the first footprint is on a first surface of the substrate and the second footprint is on a second surface of the substrate in a flip-chip configuration.

In some embodiments, the first and second footprints are oriented to minimize coupling effect between the qubit and the readout resonator. The first electric dipole of the qubit and the second electric dipole of the readout resonator are orthogonal.

In some embodiments, the first and second footprints are oriented to enhance a coupling effect between the qubit and the readout resonator. The first electric dipole and the second electric dipole may be parallel. The qubit and the readout resonator may not be physically in contact. The coupling effect between the qubit and the readout resonator is sufficient to provide a state of the qubit to the readout resonator.

In some embodiments, the readout resonator operates in a higher order mode having more than two charged sections, while the Josephson Junction (JJ) implementing the qubit includes more than two (e.g., 3 or 4) superconductor pads that are configured to couple to a particular resonator mode based on a geometry between the qubit and the readout resonator.

By controlling the orientation of the readout resonator relative to the qubit, the coupling effect between the qubit and the readout resonator can be suppressed or enhanced. In addition, by overlapping the readout resonator and the qubit in a qubit device, higher component density and smaller chip size can be realized to achieve better scalability.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

For a quantum computing system based on qubits, one limitation to scalability is the density of components that are used to implement a qubit in a qubit chip or qubit device. Currently, most components of a qubit device are kept shielded from each other (with bumps, vias or large spacing) to avoid unwanted interactions among the components. This requirement for shielding components from each other places a limit on increased chip density. With the recent push to increase the number of qubits implemented on each qubit device, the minimization of the on-chip footprint of a qubit and its connected supporting circuitry is becoming increasingly salient. Currently, some of the qubit's supporting circuitry, such as the readout resonator, is placed on a separate resonator chip (e.g., on an interposer) away from the qubit chip. This is due to concerns of undesirable coupling between the readout resonator and the qubit.

Some embodiments of the disclosure provide a method for decreasing the footprint of a qubit in a qubit device. The qubit device implements a qubit circuit and a readout resonator circuit. The qubit circuit and the readout resonator circuit are on different planes, with one plane above the other. In some embodiments, to mitigate the concern of undesirable coupling, the electric dipoles of the qubit circuit and the readout resonator circuit are set to be orthogonal, resulting in no change to the total coupling between the two circuit structures. The qubit-resonator interactions are enhanced or suppressed by inter-plane coupling with accurate control provided by the exact orientation of the electric dipole. In some embodiments, a readout resonator and a transmon implementing a qubit overlap in a flip-chip design, without impact to the readout chip. In some embodiments, the readout resonator circuit may be placed on an interposer above the qubit circuit.

Figure 1:
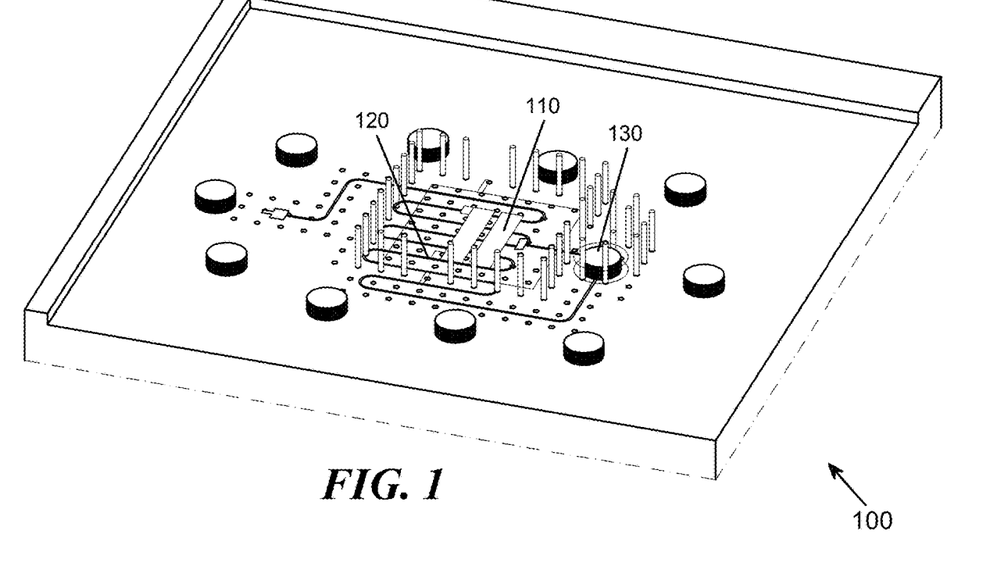
FIG. 1 shows a 3D representation of a qubit device having a qubit device design that is consistent with an illustrative embodiment.

FIGS. 1-4 illustrate a qubit device design in which the readout resonator circuit is placed above the qubit circuit, with electric dipoles of the two circuit structures being orthogonal. FIG. 1 shows a 3D representation of a qubit device 100 having a qubit device design that is consistent with an illustrative embodiment. The qubit device design 100 includes a transmon qubit circuit 110 and a readout resonator circuit 120. The transmon qubit circuit 110 overlaps the readout resonator circuit 120 in different planes or layers. The circuit components of the different planes or layers are interconnected by a via 130.

Figure 2:
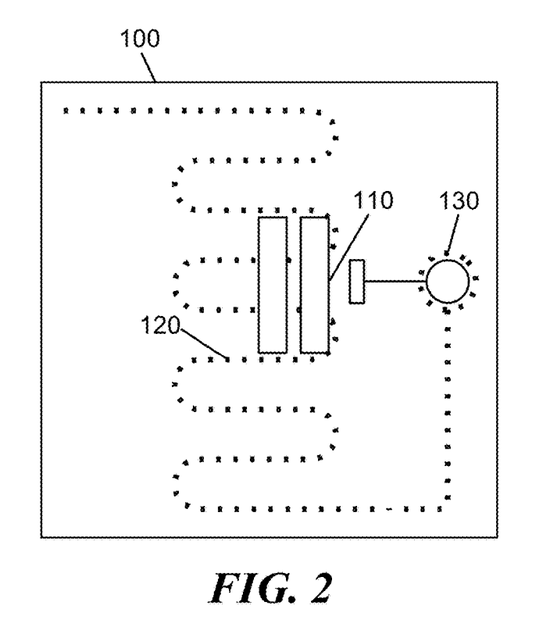
FIG. 2 shows a corresponding 2D representation of the qubit device, consistent with an illustrative embodiment.
Figure 3:
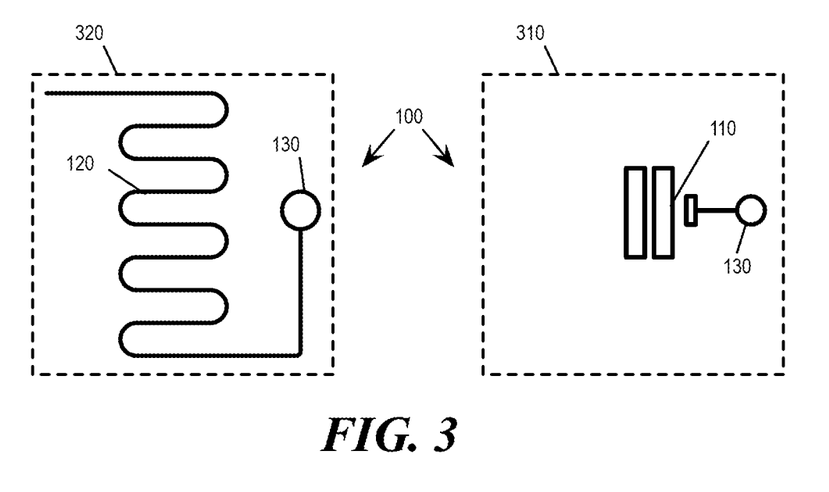
FIG. 3 shows different layers of the qubit device, in which a first layer includes the circuit components of the transmon qubit circuit and a second layer includes the circuit components of the readout resonator.

FIG. 2 shows a corresponding 2D representation of the qubit device 100, consistent with an exemplary embodiment. In the figure, the circuit components of the transmon qubit circuit 110 are shown in solid lines while the circuit components of the readout resonator circuit 120 are shown in dotted lines. FIG. 3 shows different layers of the qubit device 100, in which a first layer 310 includes the circuit components of the transmon qubit circuit 110 and a second layer 320 includes the circuit components of the readout resonator 120. The via structure 130 connects the transmon qubit circuit 110 from the first layer 310 to the readout resonator 120 in the second layer 320.

Figure 4:
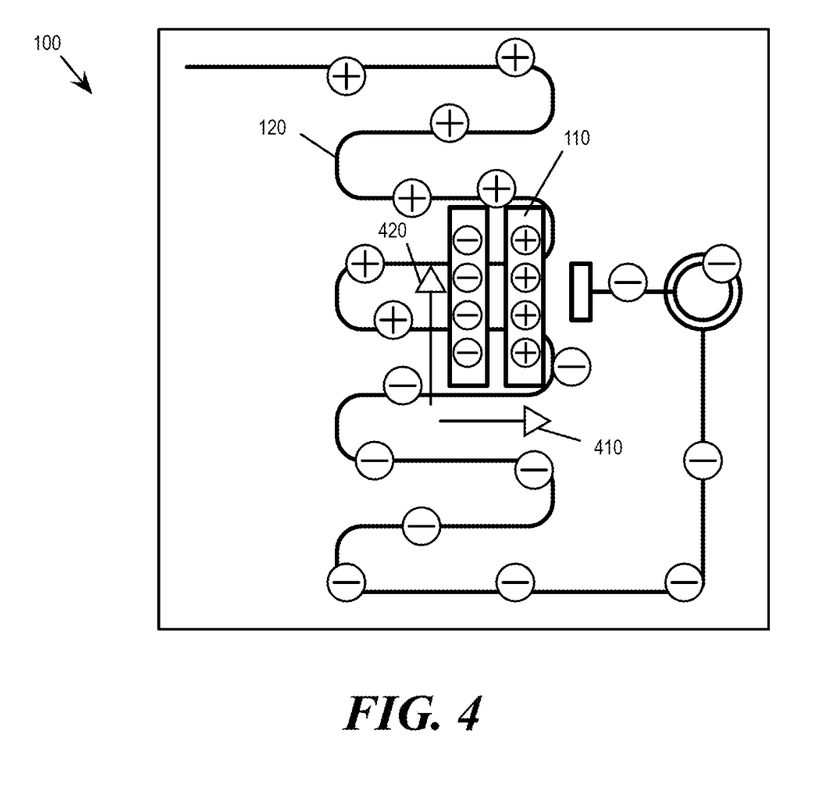
FIG. 4 conceptually illustrates the electric dipoles of the transmon and the readout resonator.

FIG. 4 conceptually illustrates the electric dipoles of the transmon and the readout resonator. As illustrated, the orientations of the transmon qubit circuit 110 and of the readout resonator 120 are configured such that during operations of the qubit device 100, the electric charges of the two circuit structures form dipoles 410 (of the transmon) and 420 (of the readout resonator). In this example, the two dipoles 410 and 420 are orthogonal.

Figure 5:
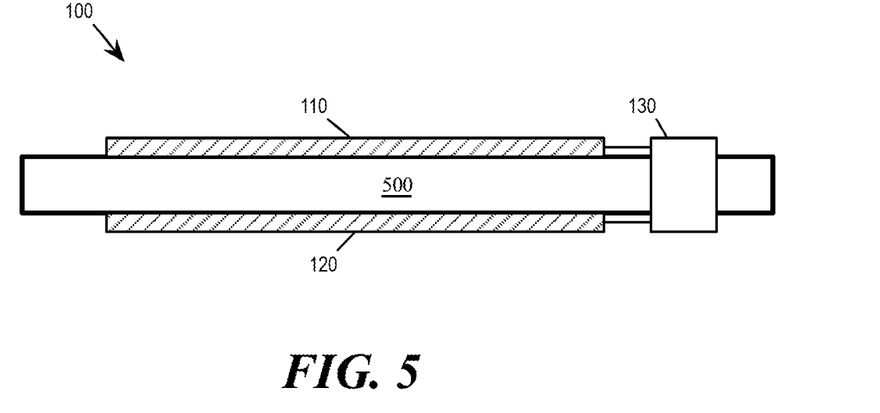
FIG. 5 illustrates a cross section views of a qubit device that is implemented on as a flip-chip design, consistent with an illustrative embodiment.

As mentioned, in some embodiments, the readout resonator and the transmon qubit overlap in a flip-chip configuration without impact to the readout chip, such that the footprint of the transmon qubit is on a first surface of a substrate and the footprint of the readout resonator is on a second surface of the substrate. FIG. 5 illustrates a cross section views of the qubit device 100 that is implemented on as a flip-chip design, consistent with an illustrative embodiment. As illustrated, the qubit device 100 is built on a substrate 500. The circuit components of the qubit transmon 110 populates the top surface of the substrate 500, while the circuit components of the readout resonator populate the bottom surface of the substrate 500. The via 130 interconnects the two circuit structures at the surfaces of the substrate.

Figure 6:
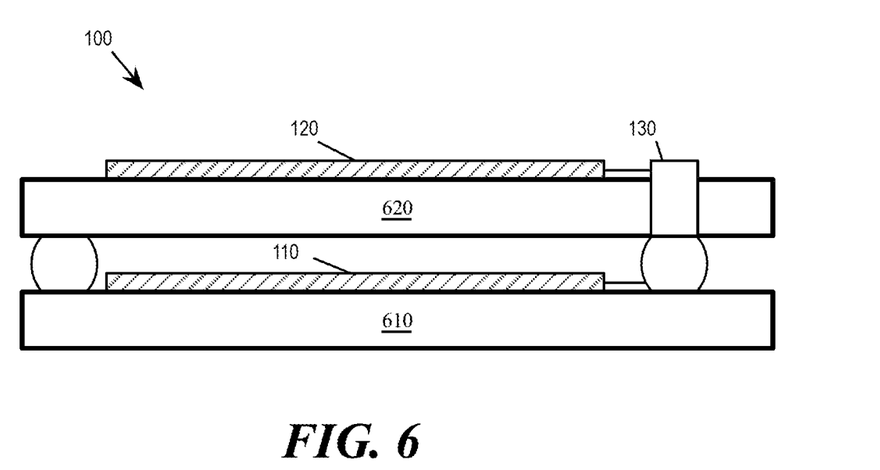
FIG. 6 illustrates a cross section view of a qubit device in which the readout resonator is implemented on an interposer, consistent with an illustrative embodiment.

In some embodiments, the readout resonator and the transmon qubit overlap in a substrate-interposer configuration, such that the footprint of the transmon qubit is on a surface of a substrate and the footprint of the readout resonator is on a surface of an interposer above the substrate. FIG. 6 illustrates a cross section view of the qubit device 100 in which the readout resonator is implemented on an interposer, consistent with an illustrative embodiment. As illustrated, the qubit device 100 is built on a substrate 610 having an interposer mounted above through bumps. The circuit components of the qubit transmon 110 populate the top surface of the substrate 610, while the circuit components of the readout resonator 120 populate a surface of an interposer 620. The via 130 is implemented by one of the bumps that mount the interposer 620 to the substrate 610.

Though the readout resonator 120 is placed immediately above the transmon qubit 110 (in order to reduce chip area), it is empirically determined that, by having the electric dipoles of the two structures to be orthogonal, the coupling is similar to when the readout resonator circuit and the qubit transmon circuit are placed far apart or isolated from each other.

Figure 7:
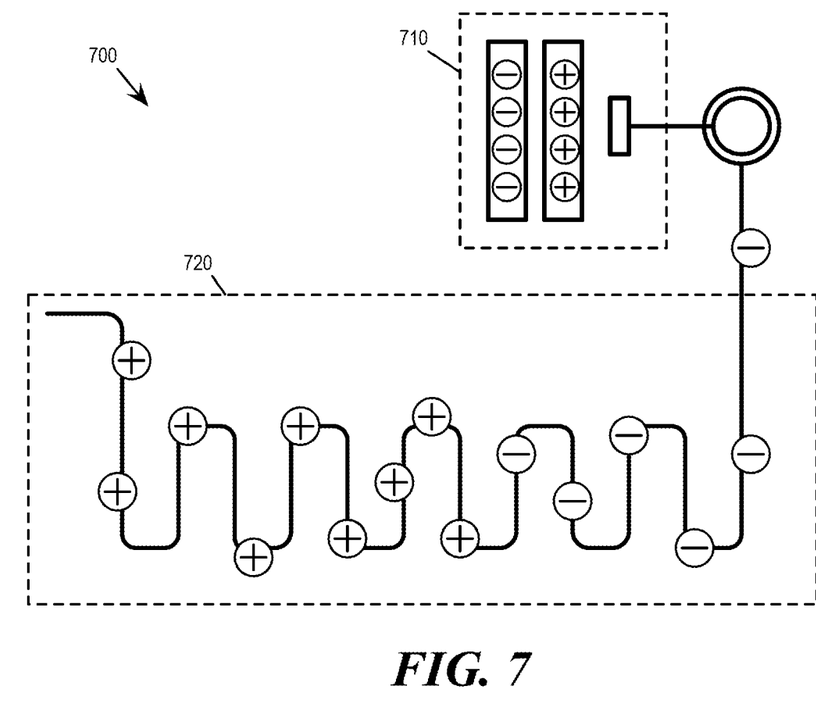
FIG. 7 illustrates a qubit device in which the qubit transmon is isolated from the readout resonator.

FIG. 7 illustrates a qubit device 700 in which a qubit transmon 710 is isolated from a readout resonator 720. The qubit transmon 710 and the readout resonator are separated to minimize coupling effect. Simulations show that, when the dipoles of the two structures are orthogonal to each other, the qubit device 100 having the qubit transmon overlapping the readout resonator can have coupling effect nearly as low as when the qubit transmon and the readout resonator are isolated from each other (e.g., the qubit device 700).

Figure 8:
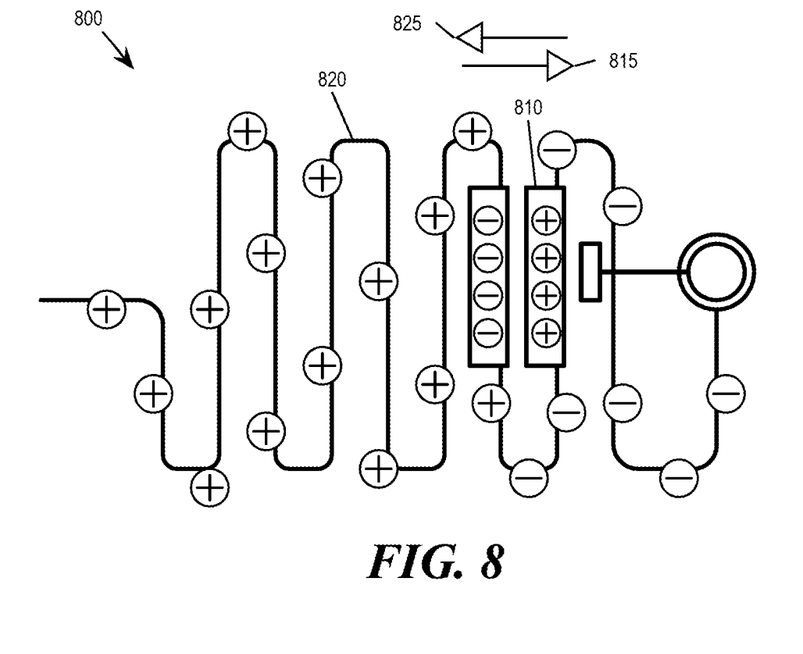
FIG. 8 illustrates a qubit device in which the qubit transmon and the readout resonator are positioned and oriented to enhance coupling.

FIGS. 1-4 show a qubit device 100 in which the qubit transmon and the readout resonator are positioned to substantially minimize coupling (e.g., to reduce coupling from a maximum coupling condition.) In some embodiments, a qubit device may have the qubit transmon and the readout resonator positioned and oriented to enhance coupling, specifically by aligning the electric dipole of the two structures. FIG. 8 illustrates a qubit device 800 in which a qubit transmon 810 and a readout resonator 820 are positioned and oriented to enhance coupling. As illustrated, the orientations of the transmon qubit circuit 810 and of the readout resonator 820 are configured such that during operations of the qubit device 800, the electric charges of the two circuit structures form dipoles 815 and 825 that are parallel or aligned in a same direction, thereby enhance the coupling between the qubit circuit 810 and the readout resonator 820.

In the examples of FIGS. 1-8, the interconnect between the qubit and the resonator relies on the capacitance of the gap (between the qubit and the readout resonator) to couple the qubit and the resonator, and by using the optimal dipole orientation to keep sufficient coupling between the qubit transmon and the readout resonator. The coupling effect between the qubit and the readout resonator is sufficient to provide a state of the qubit to the readout resonator.

In some embodiments, the qubit device is configured to use higher order modes of the resonator and to only have additive field coupling at those modes (while having subtractive field at other modes). This may allow for multiple qubits on the same readout resonator, but at different modes/frequencies.

Figure 9A:
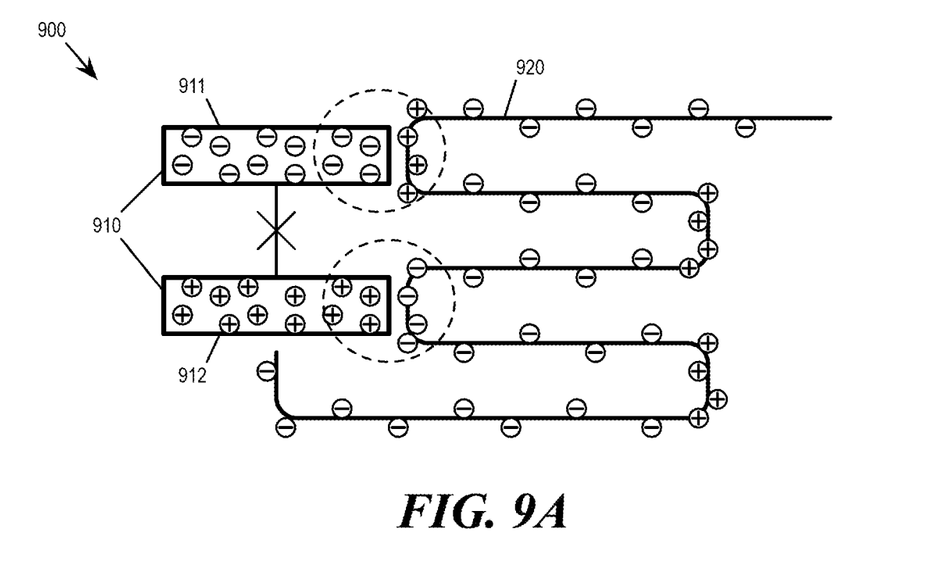
FIGS. 9A-B conceptually illustrates an example layout of a qubit circuit that uses higher order modes of the readout resonator to reduce or enhance coupling.
Figure 9B:
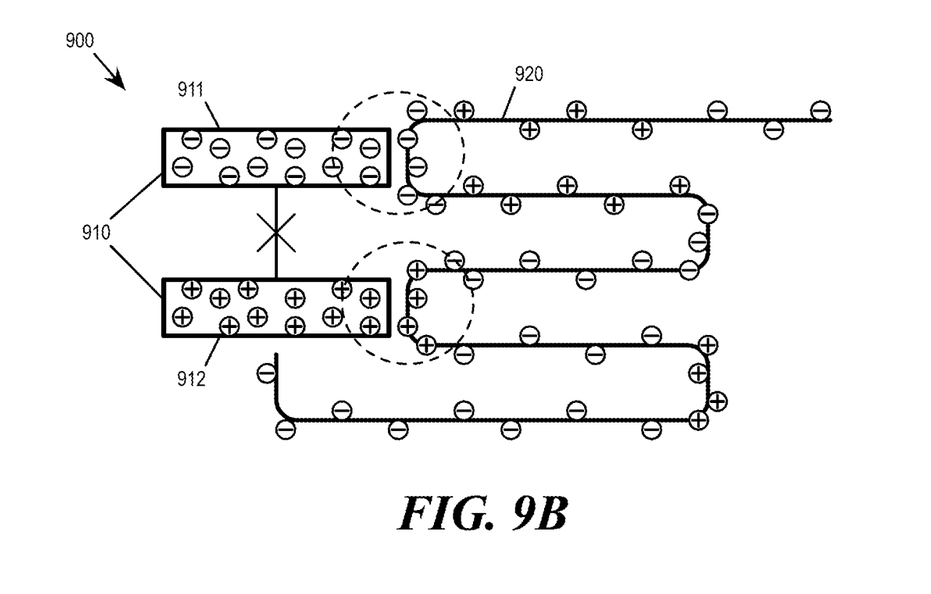

FIGS. 9A-B conceptually illustrate an example layout of a qubit circuit that uses higher order modes of the readout resonator to reduce or enhance coupling, consistent with an illustrative embodiment. The figure illustrates a qubit device 900 having a qubit transmon 910 and a readout resonator 920. The qubit transmon 910 is implemented by a Josephson Junction having two superconductor pads 911 and 912. FIG. 9A shows the readout resonator 920 operating in a higher order mode that enhances coupling effect between the qubit and the resonator due to the electric fields from the superconductor pads 910 being additive to the electric fields of the resonator 920. Specifically, each superconductor pad (911 and 912) of the qubit 910 is positioned near a charged section of the resonator 920 that has an opposite charge.

FIG. 9B shows the readout resonator 920 operating in an alternative mode that suppresses the coupling effect between the qubit and the resonator due to the electric fields from the superconductor pads 910 being subtractive to the electric fields of the resonator 920. Specifically, each superconductor pad or pad (911 and 912) of the qubit 910 is positioned near a charged section of the resonator 920 that has a same charge.

In some embodiments, an alternative qubit design is used to enhance the coupling effect between the qubit and the resonator. Specifically, the readout resonator operates in a higher order mode and the qubit transmon is implemented by a Josephson Junction (JJ) having more than two superconductor pads. The superconducting pads of the JJ are configured to couple to a particular resonator mode based on a geometry between the qubit and the readout resonator. For example, each superconductor pad may be positioned to overlap a charged section of the readout resonator carrying an opposite charge from the superconductor pad to enhance a coupling effect between the qubit and the readout resonator. The superconductor pads are also positioned such that, for other modes of the readout resonator, there is no effective coupling.

Figure 10:
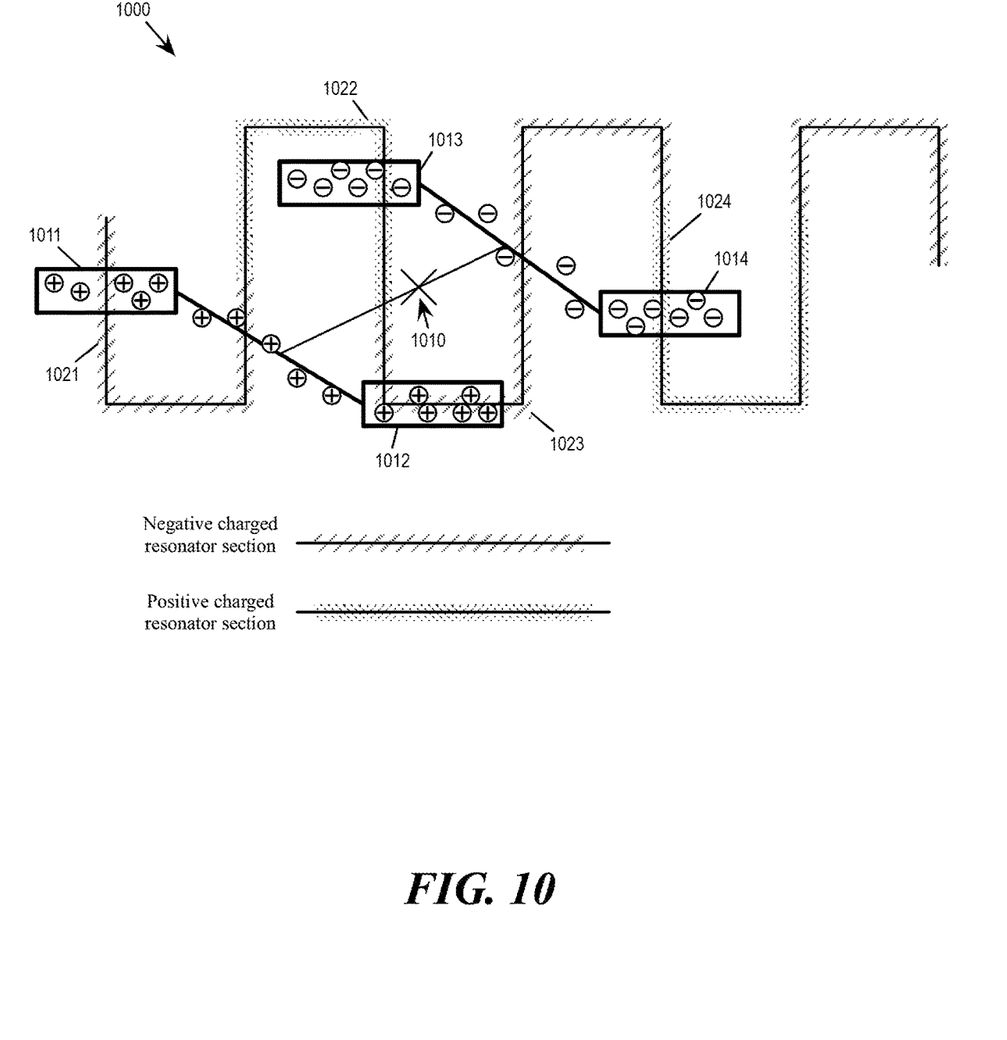
FIG. 10 illustrates an alternative qubit design that uses a higher harmonic mode of the resonator to enhance the coupling effect.

FIG. 10 illustrates an alternative qubit design that uses a higher harmonic mode of the resonator to enhance the coupling effect, consistent with an illustrative embodiment. In the example, the qubit has four superconductor pads that are positioned to match the harmonic mode of the resonator. As illustrated, a qubit device 1000 has a qubit 1010 that overlaps its readout resonator 1020. The qubit 1010 is implemented by Josephson Junction having four superconductor pads 1011-1014. The resonator is operating in a higher order mode such that different charged sections 1021-1024 of the resonator have different electrical charges with different electric field directions.

The different superconductor pads of the qubit 1010 are positioned to overlap the different charged sections of the resonator 1020. At the instance in time illustrated, the superconductor pads 1011 and 1012 of the qubit have positive charges while the superconductor pads 1013 and 1014 have negative charges. The resonator section 1021 and 1023 have negative charges while the resonator sections 1022 and 1024 have positive charges. As illustrated, the superconductor pad 1011 overlaps resonator section 1021, the superconductor pad 1012 overlaps resonator section 1023, the superconductor pad 1013 overlaps resonator section 1022, and the superconductor pad 1014 overlaps resonator section 1024. The additive fields at the different overlapping sections and superconductor pads enhance the coupling effect of the qubit 1010 and the resonator 1020.

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device comprising:
   a first set of circuit components implementing a qubit; and
   a second set of circuit components coupled to the first set of circuit components, the second set of circuit components implementing a readout resonator for reading out a state of the qubit,
   wherein:
     a first footprint of the first set of circuit components overlaps a second footprint of the second set of circuit components, and
     the first footprint is oriented relative to the second footprint based on a first electric dipole of the first set of circuit components and a second electric dipole of the second set of circuit components.

2. The device of claim 1, further comprising a substrate and an interposer, wherein the first footprint is on a first surface of the substrate and the second footprint is on a first surface of an interposer.

3. The device of claim 1, further comprises a substrate, wherein:
   the first footprint is on a first surface of the substrate, and
   the second footprint is on a second surface of the substrate.

4. The device of claim 1, wherein the first electric dipole of the qubit and the second electric dipole of the readout resonator are orthogonal.

5. The device of claim 4, wherein the first and second footprints are oriented to substantially minimize a coupling effect between the qubit and the readout resonator.

6. The device of claim 1, wherein the first and second footprints are oriented to enhance a coupling effect between the qubit and the readout resonator.

7. The device of claim 6, wherein the coupling effect between the qubit and the readout resonator is sufficient to provide a state of the qubit to the readout resonator.

8. The device of claim 6, wherein the first electric dipole of the qubit and the second electric dipole of the readout resonator are parallel.

9. A method comprising:
   implementing a qubit at a first set of circuit components;
   implementing a readout resonator at a second set of circuit components for reading out a state of the qubit;
   overlapping a first footprint of the first set of circuit components with a second footprint of the second set of circuit components; and
   orienting the first footprint relative to the second footprint based on a first electric dipole of the first set of circuit components and a second electric dipole of the second set of circuit components.

10. The method of claim 9, further comprising providing a substrate and an interposer, wherein the first footprint is on a first surface of the substrate and the second footprint is on a first surface of the interposer.

11. The method of claim 9, further comprising:
    providing a substrate:
    arranging the first footprint on a first surface of the substrate; and
    arranging the second footprint on a second surface of the substrate.

12. The method of claim 9, further comprising substantially minimizing a coupling effect between the qubit and the readout resonator by orienting the first and second footprints.

13. The method of claim 9, further comprising arranging the first electric dipole of the qubit and the second electric dipole of the readout resonator to be orthogonal.

14. The method of claim 9, further comprising enhancing coupling effect between the qubit and the readout resonator by orienting the first and second footprints.

15. The method of claim 14, further comprising using the coupling effect between the qubit and the readout resonator to read the state of the qubit.

16. The method of claim 14, wherein the qubit and the readout resonator do not share physical electrical contact.

17. The method of claim 14, wherein the first electric dipole of the qubit and the second electric dipole of the readout resonator are parallel.

* * * * *